United States Patent
Hecht et al.

(10) Patent No.: US 9,168,651 B2
(45) Date of Patent: Oct. 27, 2015

(54) HAND-HELD MACHINE TOOL WITH A TORQUE CLUTCH

(71) Applicants: Joachim Hecht, Magstadt (DE); Martin Kraus, Filderstadt (DE)

(72) Inventors: Joachim Hecht, Magstadt (DE); Martin Kraus, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/062,443

(22) Filed: Oct. 24, 2013

(65) Prior Publication Data
US 2014/0116833 A1    May 1, 2014

(30) Foreign Application Priority Data
Oct. 25, 2012 (DE) .......................... 10 2012 219 495

(51) Int. Cl.
*F16D 7/08* (2006.01)
*B25F 5/00* (2006.01)
*F16D 43/206* (2006.01)

(52) U.S. Cl.
CPC . *B25F 5/001* (2013.01); *F16D 7/08* (2013.01); *F16D 43/206* (2013.01)

(58) Field of Classification Search
USPC .................. 192/56.6, 56.62, 56.61; 173/178; 464/36, 38
See application file for complete search history.

(56) References Cited

U.S. PATENT DOCUMENTS

| | | | |
|---|---|---|---|
| 2002/0153219 A1* | 10/2002 | Chen | 192/56.62 |
| 2011/0017484 A1* | 1/2011 | Roehm | 173/178 |
| 2011/0147022 A1* | 6/2011 | Roehm et al. | 173/47 |
| 2012/0132449 A1* | 5/2012 | Hecht et al. | 173/5 |

FOREIGN PATENT DOCUMENTS

DE    10 2009 046 663    11/2009

* cited by examiner

*Primary Examiner* — Rodney H Bonck
*Assistant Examiner* — Lillian Nguyen
(74) *Attorney, Agent, or Firm* — Kenyon & Kenyon LLP

(57) ABSTRACT

A hand-held machine tool includes a gear unit and a torque clutch that has a torque-limiting coupling allocated to the gear unit and that is assigned at least one spring element which is clamped between a limit-transfer element and a spring-holding element, and which is designed to apply a predefined spring force to the limit-transfer element axially in the direction of the torque-limiting coupling. The spring-holding element includes at least one opening, through which the at least one spring element reaches, at least sectionally.

10 Claims, 6 Drawing Sheets

HAND-HELD MACHINE TOOL WITH A TORQUE CLUTCH

CROSS REFERENCE TO RELATED APPLICATION

The present application claims priority to Application No. DE 10 2012 219 495.9, filed in the Federal Republic of Germany on Oct. 25, 2012, which is expressly incorporated herein in its entirety by reference thereto.

FIELD OF INVENTION

The present invention relates to a hand-held machine tool having a gear unit and a torque clutch, that has a torque-limiting coupling allocated to the gear unit and that is assigned at least one spring element which is clamped between a limit-transfer element and a spring-holding element and which is designed to apply a predefined spring force to the limit-transfer element axially in the direction of the torque-limiting coupling.

BACKGROUND INFORMATION

German Application No. DE 10 2009 046 663 describes a hand-held machine tool having a gear unit and a torque clutch, which has a torque-limiting coupling assigned to the gear unit. A limit-transfer element is acted upon by a spring element with a predefined spring force axially in the direction of the torque-limiting coupling, the spring force being adjustable within predefined limits via an assigned torque-adjusting sleeve.

The spring element is clamped between an assigned spring-holding element and the limit-transfer element. The spring-holding element has a spring-guide section which is formed parallel to the longitudinal axis of the spring element and which, in the area between the torque-adjusting sleeve and the spring element, abuts against it in order to guide the spring element in the direction of its longitudinal axis during tensioning or release.

The related art has the disadvantage that the spring-guide section, because of its dimensions, especially its assigned wall thickness, requires the use of a torque-adjusting sleeve having a comparatively large diameter, so that the torque clutch has comparatively large dimensions overall. The applicability of the hand-held machine tool, especially in work environments that are tight and difficult to access, may thereby be limited.

SUMMARY

An object of the present invention is therefore to provide a new hand-held machine tool having a torque clutch which has reduced dimensions.

This objective is achieved by a hand-held machine tool having a gear unit and a torque clutch, that has a torque-limiting coupling allocated to the gear unit and that is assigned at least one spring element which is clamped between a limit-transfer element and a spring-holding element and which is designed to apply a predefined spring force to the limit-transfer element axially in the direction of the torque-limiting coupling. The spring-holding element has at least one opening, through which the at least one spring element reaches, at least sectionally.

Therefore, the present invention makes it possible to provide a hand-held machine tool in which, by reducing the dimensions of the spring-holding element with the aid of the openings provided on it, it is possible to reduce the dimensions of the torque clutch, so that the hand-held machine tool is able to be realized with a reduced size overall.

According to one exemplary embodiment, the predefined spring force is adjustable within predefined limits via an assigned torque-adjusting device.

Consequently, a torque limitation desired at any one time may be adjusted in an easy manner.

The spring-holding element preferably has at least one spring holder on which the at least one opening is formed in the manner of a perforation or cutout.

A stable and robust spring-holding element may thus be provided.

The at least one spring holder is preferably hook-shaped.

Thus, an inexpensive and uncomplicated spring holder may be provided.

According to one exemplary embodiment, the spring-holding element has an actuating section on which the at least one spring holder is formed, the actuating section, in order to tension or release the at least one spring element, being displaceable axially in its longitudinal direction.

The present invention therefore makes it possible to provide a spring-holding element which is displaceable safely and reliably axially in the longitudinal direction of the spring element in order to tension or release it.

The actuating section is preferably ring-shaped.

Consequently, a simple and robust actuating section may be provided.

The ring-shaped actuating section preferably has a reach-through opening that is aligned at least approximately perpendicular to the at least one opening.

Therefore, it is possible to provide a spring holder, formed on the actuating section, which abuts axially against an assigned spring element at least in some areas, and therefore is able to guide it safely and reliably in the axial direction during tensioning or release.

According to one exemplary embodiment, the actuating section is preloaded by the predefined spring force of the at least one spring element against an adjusting ring that is able to be acted upon via an actuatable torque-adjusting sleeve, assigned to the torque-adjusting device, for the axial displacement in the longitudinal direction of the at least one spring element.

The present invention therefore makes it possible to provide a hand-held machine tool having a torque clutch, in which a torque limitation desired at any one time may be adjusted in an easy manner.

At the free end of the at least one spring holder, preferably a seating element is provided, against which the at least one spring element abuts, at least sectionally.

Therefore, the spring element may be prevented effectively from slipping out of the spring holder.

Preferably, the seating element is aligned at least approximately parallel to the actuating section.

A robust and reliable spring-holding element may thus be provided.

According to one exemplary embodiment, the gear unit is assigned a gear housing, at whose periphery at least one groove-like cutout is formed for receiving the at least one spring element in its longitudinal direction.

The present invention therefore makes it possible to provide a hand-held machine tool having a torque clutch, whose spring elements are supported reliably and stably against a gear housing assigned to the hand-held machine tool.

Exemplary embodiments of the present invention are described in greater detail in the following description with reference to the accompanying drawings.

DETAILED DESCRIPTION

Figure 1:
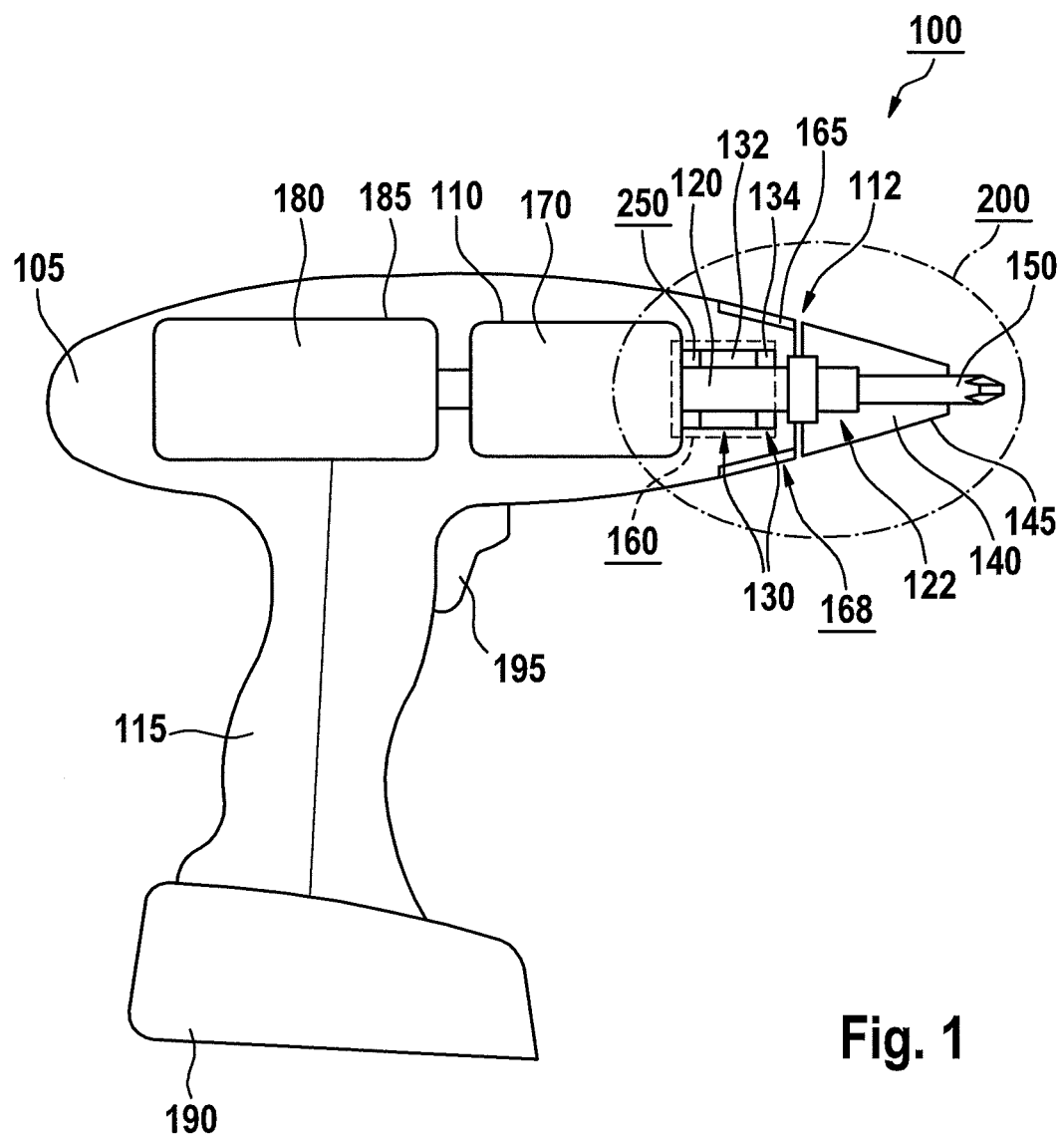
FIG. 1 shows a schematic view of a hand-held machine tool having a torque clutch according to the present invention.

FIG. 1 shows an exemplary hand-held machine tool 100, provided with a torque clutch 160, which has a tool housing 105 having a grip 115. According to one exemplary embodiment, hand-held machine tool 100 is connectable mechanically and electrically to a battery pack 190 for the cordless power supply. By way of example, hand-held machine tool 100 in FIG. 1 is in the form of a cordless drill/driver. However, it is pointed out that the present invention is not limited to cordless drill/drivers, but rather may be used for various hand-held machine tools which have a torque clutch corresponding to torque clutch 160, regardless of whether the hand-held machine tool is operable electrically, i.e., in battery-powered fashion with battery pack 190 or in mains-dependent fashion and/or non-electrically.

Disposed in tool housing 105, for example, are an electric drive motor 180, supplied with current by battery pack 190, and a gear unit 170. Drive motor 180 is connected to a drive shaft 120, e.g., a drive spindle, via gear unit 170. As illustrated, drive motor 180 is situated in a motor housing 185 and gear unit 170 is in a gear housing 110, gear housing 110 and motor housing 185 being disposed in tool housing 105, for example.

Gear unit 170 is designed to transfer a torque, generated by drive motor 180, to drive spindle 120, and according to one exemplary embodiment, is a planetary gear formed with various gear steps or planetary steps, which is driven rotationally by drive motor 180 during operation of hand-held machine tool 100. Planetary gear 170 is described below in connection with a sectional view of a cut-away portion 200 of hand-held machine tool 100 shown enlarged in FIGS. 2 and 3.

Drive motor 180 is operable, i.e., able to be turned on and off, via a manual switch 195, for example, and may be any type of motor, e.g., an electronically commutated motor or a direct-current motor. Preferably, drive motor 180 is electronically controllable or regulable such that both a reverse operation as well as setpoint selections with respect to a desired rotational speed are able to be realized. The functioning method and the design of a suitable drive motor are known sufficiently from the related art, so that a detailed description is omitted here for conciseness.

Drive spindle 120 is rotationally mounted in tool housing 105 by way of a bearing assembly 130, and is provided with a tool holder 140 which is situated in the area of an end face 112 of tool housing 105 and, by way of example, has a drill chuck 145. According to one exemplary embodiment, bearing assembly 130 has at least two bearing positions 132, 134 which are provided in tool housing 105 in an area (299 in FIG. 2) downstream of gear unit 170. At bearing positions 132, 134, allocated bearings (232, 234 in FIG. 2) are disposed which are used as spindle bearings and in which drive spindle 120 is mounted in a manner allowing rotational movement.

Tool holder 140 is used to receive a tool 150 and may be integrally molded onto drive spindle 120 or be joined to it in the form of an attachment. By way of example, in FIG. 1, tool holder 140 is attachment-like, and is secured to drive spindle 120 via a mounting device 122 provided on drive spindle 120.

Illustratively, drive spindle 120 is assigned a spindle-lock device 250. It is disposed, for example, in the axial direction of drive spindle 120 between gear unit 170 and the two bearing positions 132, 134, and is used to center drive spindle 120 when drive motor 180 is switched off. The functioning method of spindle-lock devices is known sufficiently from the related art, so that for conciseness, a detailed description of the functioning method of spindle-lock device 250 is omitted here.

According to one exemplary embodiment, as described above, hand-held machine tool 100 has torque clutch 160. As illustrated, it is provided with a torque-adjusting device 168 that is assigned a torque-adjusting sleeve 165 operable by a user of hand-held machine tool 100. In this context, torque-adjusting sleeve 165 is used, for example, to set a work-specific torque limitation, desired in each instance by the user, by way of torque clutch 160. Torque clutch 160 is described in the following in connection with the sectional view of cut-away portion 200 of hand-held machine tool 100 shown enlarged in FIGS. 2 and 3.

Figure 2:
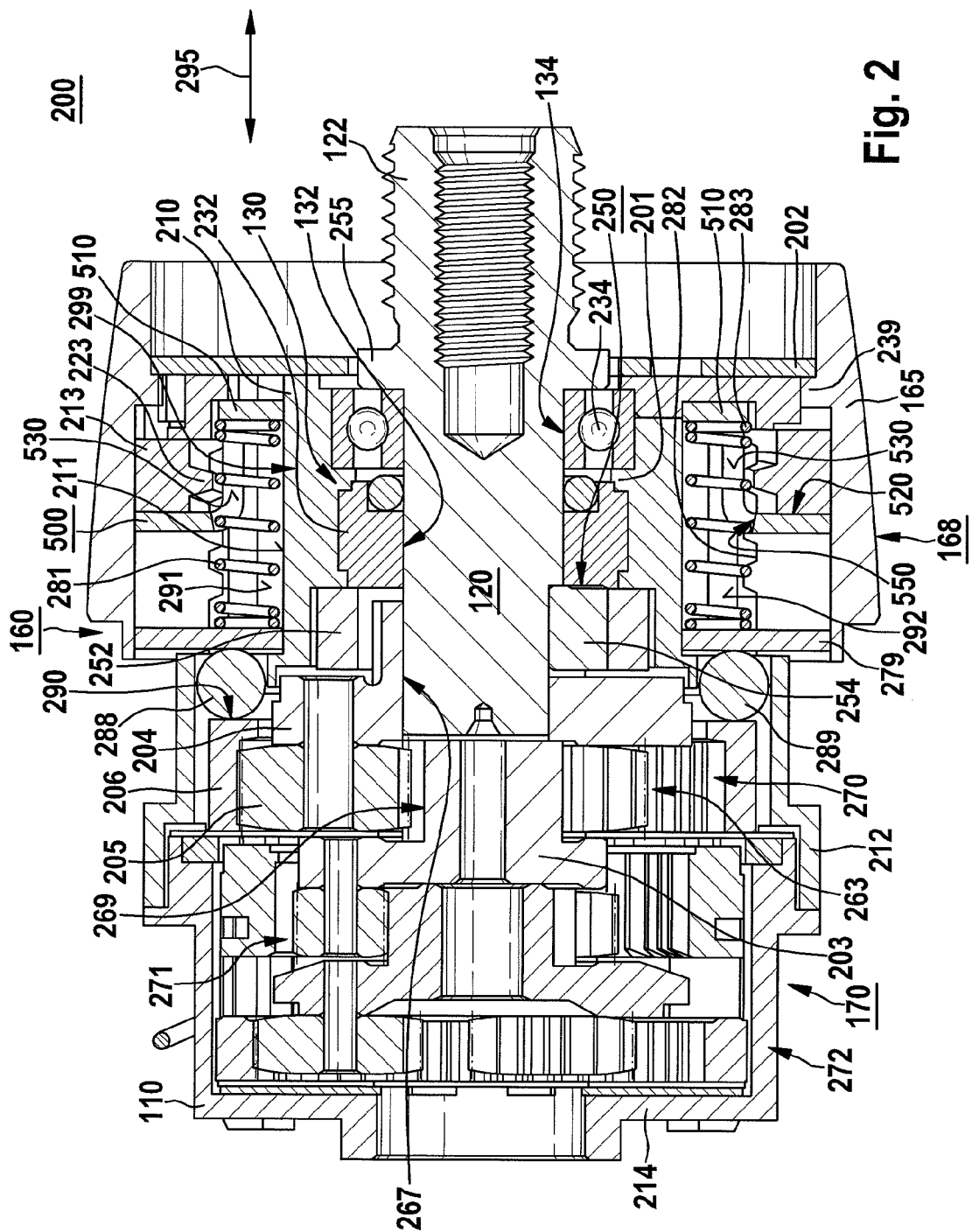
FIG. 2 shows an enlarged sectional view of a cut-away portion of the hand-held machine tool from FIG. 1 according to one exemplary embodiment with the torque clutch set in a first operating position.

FIG. 2 shows cut-away portion 200 of hand-held machine tool 100 from FIG. 1 in which, for the purpose of keeping the drawing clear and simple, a representation of tool 150, tool holder 140 and tool housing 105 from FIG. 1 was omitted. Cut-away portion 200 clarifies an exemplary form of planetary gear 170, drive spindle 120, bearing assembly 130, spindle-lock device 250 as well as torque clutch 160 according to one exemplary embodiment.

For example, planetary gear 170 has three gear-ratio steps or planetary steps: a front step 270, a middle step 271 and a rear step 272. For instance, front planetary step 270 has a sun gear 203 having a toothing 269, at least one planet gear 205 having a toothing 263, a planet carrier 204 having a rotary entrainment contour 267, as well as a ring gear 206. A corresponding torque of drive motor 180 from FIG. 1 is transferred via planetary steps 272, 271, 270 with the aid of rotary entrainment contour 267 of planet carrier 204 to drive spindle 120. In this context, planet carrier 204 is used as driving element to rotate drive spindle 120. Since the design of a planetary gear is sufficiently familiar to one skilled in the art, a further description of planetary steps 271, 272 is omitted here for conciseness.

As illustrated, planetary steps 270, 271, 272 are disposed in gear housing 110 which, for example, is in three parts and has a front part 210, a middle part 212 and a rear part 214, front part 210 and middle part 212 being formed in one piece, by way of example. Illustratively, front part 210 has an external thread 282, on which an adjusting ring 213 is rotationally mounted, for example. An annular shoulder 201 is formed, for instance, on the inner circumference of front part 210.

Drive spindle 120 has mounting device 122, formed illustratively as external thread, on which drill chuck 145 of tool holder 140 of FIG. 1 is able to be mounted, external thread 122 being able to be brought into thread engagement, for example, with an internal thread provided on drill chuck 145. Moreover, by way of example, a support flange 255 is provided on drive spindle 120.

For instance, bearing assembly 130 is disposed in an area 299 downstream of gear unit 170, and as illustrated, has a plain bearing 232, e.g., a sintered bearing, and a rolling-contact bearing 234, e.g., a ball bearing. For instance, sintered bearing 232 is disposed at bearing position 132, also denoted hereinafter as first bearing position, which, as viewed in the direction of tool holder 140 from FIG. 1, is downstream of planet carrier 204 and therefore gear unit 170. As example, ball bearing 234 is disposed at bearing position 134, also denoted hereinafter as second bearing position, which, as viewed in the direction of tool holder 140 from FIG. 1, is immediately downstream of first bearing position 134, and is supported on support flange 255. For example, sintered bearing 232 and ball bearing 234 are set apart from each other via annular shoulder 201.

Illustratively, spindle-lock device 250 has a clamping ring 252 which is supported on drive spindle 120 and a section of planet carrier 204 with a predefined radial play and on which at least one spindle roll 254 is disposed. However, it is pointed out that a spindle-lock device suitable for realizing spindle-lock device 250 and its method of functioning are sufficiently familiar to one skilled in the art from the related art, so that a detailed description of it is omitted here for conciseness.

As illustrated, torque clutch 160 has torque-adjusting device 168 of FIG. 1 provided with torque-adjusting sleeve 165, a torque-limiting coupling 288, 289, 290 assigned to gear unit 170, at least one limit-transfer element 279, at least one spring-holding element 500 and at least one assigned spring element 281, 283. For example, the at least one spring element 281, 283 has a plurality of helical compression springs 281, 283 (and 481, 482 in FIG. 4), which are supported in allocated groove-like cutouts 291, 292 (and 293, 294 in FIG. 4). By way of example, these groove-like cutouts 291, 292 (and 293, 294 in FIG. 4), also denoted hereinafter as "receiving grooves", are formed at periphery 211 of front part 210 of gear housing 110 in its longitudinal direction and, for example, are distributed equidistantly over periphery 211. Meanwhile, the at least one spring element 281, 283 is clamped between limit-transfer element 279 and spring-holding element 500.

Limit-transfer element 279 is formed illustratively according to a type of pressure disk or pressure plate which, on its side facing away from helical compression springs 281, 283 (and 481, 482 in FIG. 4), abuts against a detent member that, for example, has a plurality of detent balls 288, 289, and on its side facing away from limit-transfer element 279, abuts against a detent disk that is assigned to gear unit 170 and, as illustrated, is formed by ring gear 206 of front planetary step 270. Detent balls 288, 289 are supported, illustratively, in the interior of middle part 212 of gear housing 110, and are disposed in the axial direction of drive spindle 120 between an end face of ring gear 206 forming the detent disk, on which a coupling structure 290 is formed, and limit-transfer element 279. Coupling structure 290, together with detent balls 288, 289, forms torque-limiting coupling 288, 289, 290. For example, a suitable coupling structure may have a plurality of axial elevations and is sufficiently familiar to one skilled in the art, so that for conciseness, a detailed description of coupling structure 290 is omitted here.

According to one exemplary embodiment, spring-holding element 500 has at least one opening 530, formed in the manner of a perforation, through which the at least one spring element 281, 283 reaches, at least sectionally, or has a plurality of openings through which the plurality of helical compression springs 281, 283 (and 481, 482 in FIG. 4) reaches. In this context, spring-holding element 500 preferably has at least one, e.g., hook-shaped spring holder 510 on which perforation 530 is formed, so that, for instance, hook-shaped spring holder 510 is approximately U-shaped. By way of example, this at least one spring holder 510 is formed on a, e.g., ring-shaped actuating section 520 of spring-holding element 500. It is displaceable, for tensioning or releasing the at least one spring element 281, 283, axially in its longitudinal direction or co-axially relative to drive spindle 120, and has a reach-through opening 550, through which front part 210 of gear housing 110 reaches. Reach-through opening 550 is aligned at least approximately perpendicular to the at least one opening 530.

The at least one spring element 281, 283 is designed to apply a predefined spring force to limit-transfer element 279 axially in the direction of torque-limiting coupling 288, 289, 290. In this connection, the predefined spring force is adjustable within predefined limits via torque-adjusting device 168. To that end, actuating section 520 of spring-holding element 500 is preloaded by the predefined spring force of the at least one spring element 281, 283 against an adjusting ring 213, that is able to be acted upon via torque-adjusting sleeve 165 of torque-adjusting device 168 for the axial shift in the longitudinal direction of the at least one spring element 281, 283.

For example, adjusting ring 213 has meshing elements 223 which mesh with external thread 282 formed at periphery 211 of front part 210 of gear housing 110. In response to a twisting of adjusting ring 213 due to twisting of torque-adjusting sleeve 165, meshing elements 223 are used to guide adjusting ring 213 on external thread 282, and therefore to bring about an axial shift of adjusting ring 213 in the longitudinal direction of drive spindle 120, as indicated by an arrow 295.

According to one exemplary embodiment, torque-adjusting sleeve 165 of torque-adjusting device 168 is fixed in position axially on front part 210 of gear housing 110. For example, this is accomplished via a holding plate 202 which, for instance, is screw-fitted to front part 210 via assigned screws. Plate 202 encompasses drive spindle 120 and abuts against an annular shoulder 239 in torque-adjusting sleeve 165, so that in this manner, torque-adjusting sleeve 165 is also retained axially on gear housing 110.

As described in connection with FIG. 1, torque-adjusting sleeve 165 is designed to set a work-specific torque limitation, for example, desired in each instance by the user, by way of torque clutch 160. In its operating position shown in FIG. 2, this torque limitation is at its maximum, that is, the at least one spring element 281, 283 is relaxed at least to a great extent, so as in a screw mode of hand-held machine tool 100 of FIG. 1, for example, to maximally limit or reduce a torque able to be transferred by planetary gear 170 to drive spindle 120. However, it should be pointed out that the functioning method of a torque clutch is sufficiently familiar to one skilled in the art, so that for conciseness, a detailed description of the functioning method of torque clutch 160 is dispensed with here.

Figure 3:
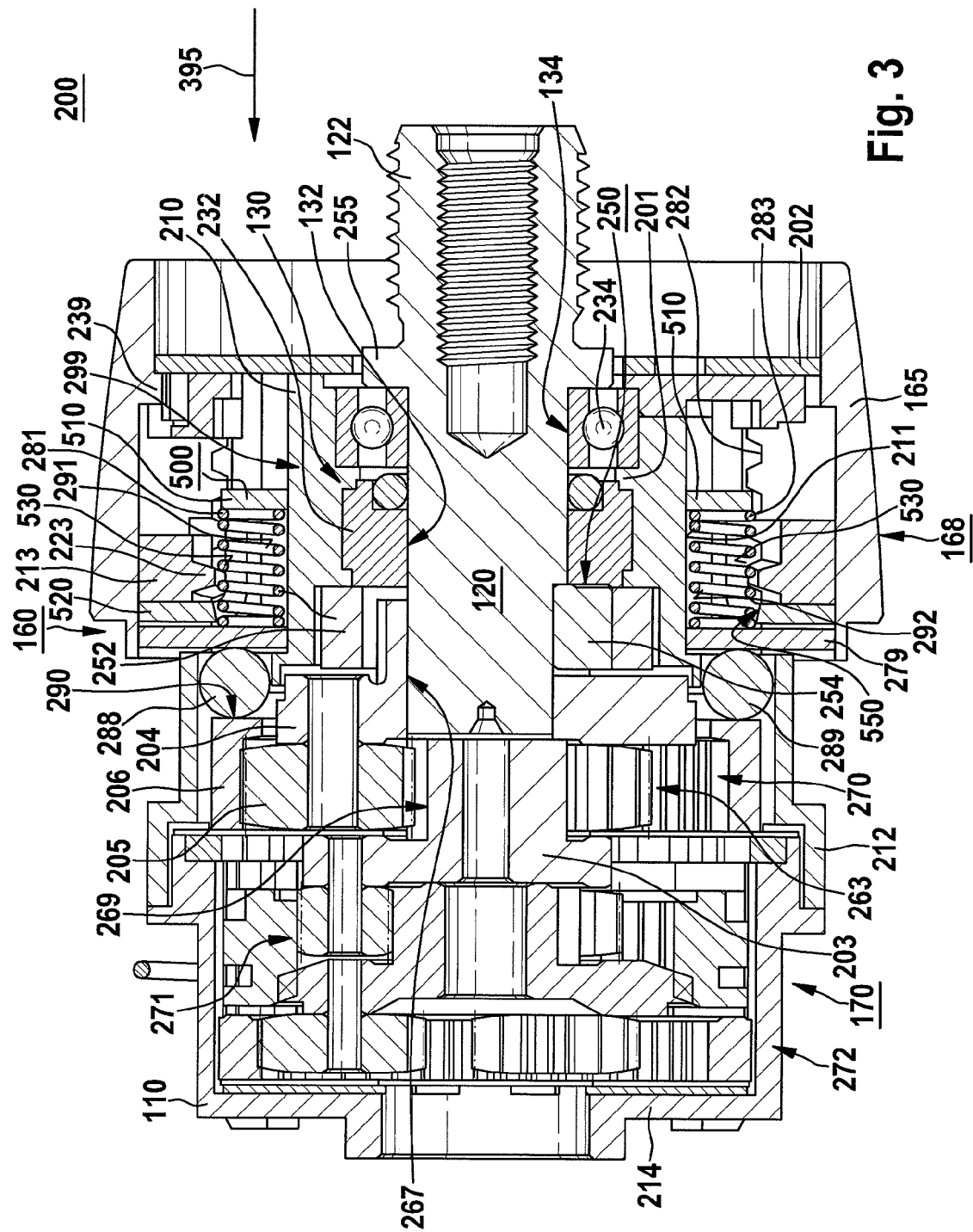
FIG. 3 shows an enlarged sectional view of a cut-away portion of the hand-held machine tool from FIG. 1 according to one exemplary embodiment with the torque clutch set in a second operating position.

FIG. 3 shows cut-away 200 from FIG. 2, in which the at least one spring element 281, 283 is tensioned at least to a great extent, spring-holding element 500 being locked by adjusting ring 213 in an operating position that is assigned to a drill mode of hand-held machine tool 100 of FIG. 1, for example, and in which actuating section 520 abuts directly against limit-transfer element 279. To reach this operating position, spring-holding element 500 is shifted axially in the direction of limit-transfer element 279 via adjusting ring 213, by a twisting of torque-adjusting sleeve 165 in order to compress the at least one spring element 281, 283, as indicated with an arrow 395. In the drill mode of hand-held machine tool 100 of FIG. 1, the maximum torque able to be transferred by planetary gear 170 to drive spindle 120 is allowed to be transferred to drive spindle 120.

Figure 4:
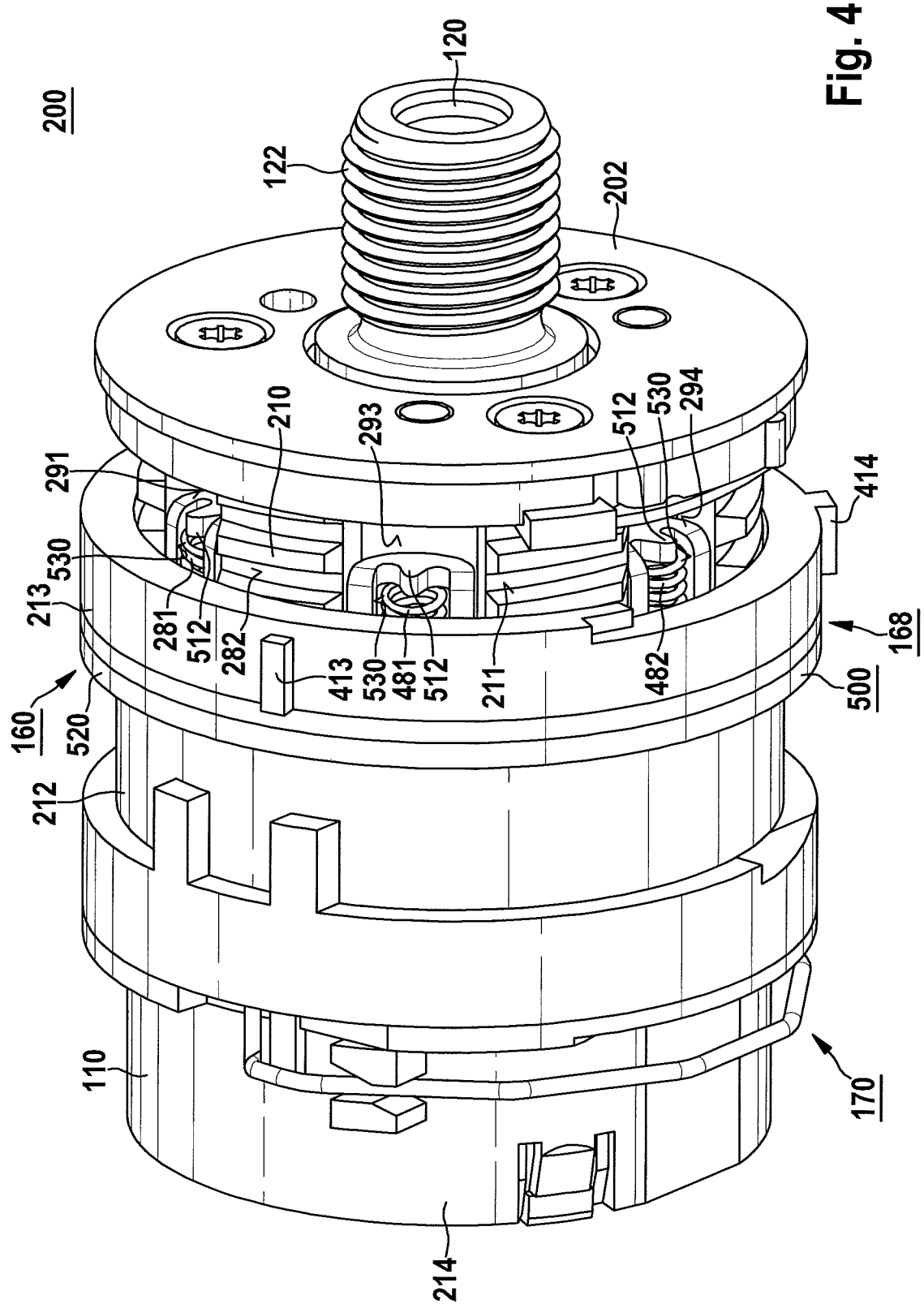
FIG. 4 shows a perspective view of the cut-away portion of the hand-held machine tool from FIG. 1 with the operating position of the torque clutch set according to FIG. 3.

FIG. 4 shows cut-away portion 200 from FIG. 3 in a perspective view, without torque-adjusting sleeve 165, for the purpose of illustrating receiving groove 291 formed at periphery 211 of front part 210 of gear housing 110, as well as two further exemplary receiving grooves 293, 294 which, illustratively, are disposed equidistantly relative to each other. As described in connection with FIG. 2, they are used to receive assigned spring elements, i.e., spring element 281 as well as two further spring elements 481, 482.

Moreover, by way of example, FIG. 4 shows longitudinal ribs formed at the periphery of adjusting ring 213, of which only two longitudinal ribs 413, 414 are visible. They are guided in assigned longitudinal grooves, which are formed on the inner circumference of torque-adjusting sleeve 165, so as, in response to a twisting of torque-adjusting sleeve 165, to permit both a twisting and an axial shift of adjusting ring 213, as described above.

In addition, by way of example, FIG. 4 shows seating elements 512 which are provided at the free end of each spring holder 510 of spring-holding element 500, and against which, respective assigned spring element 281, 481, 482 abuts, at least sectionally. Preferably, these seating elements 512 are aligned at least approximately parallel to actuating section 520.

Figure 5:
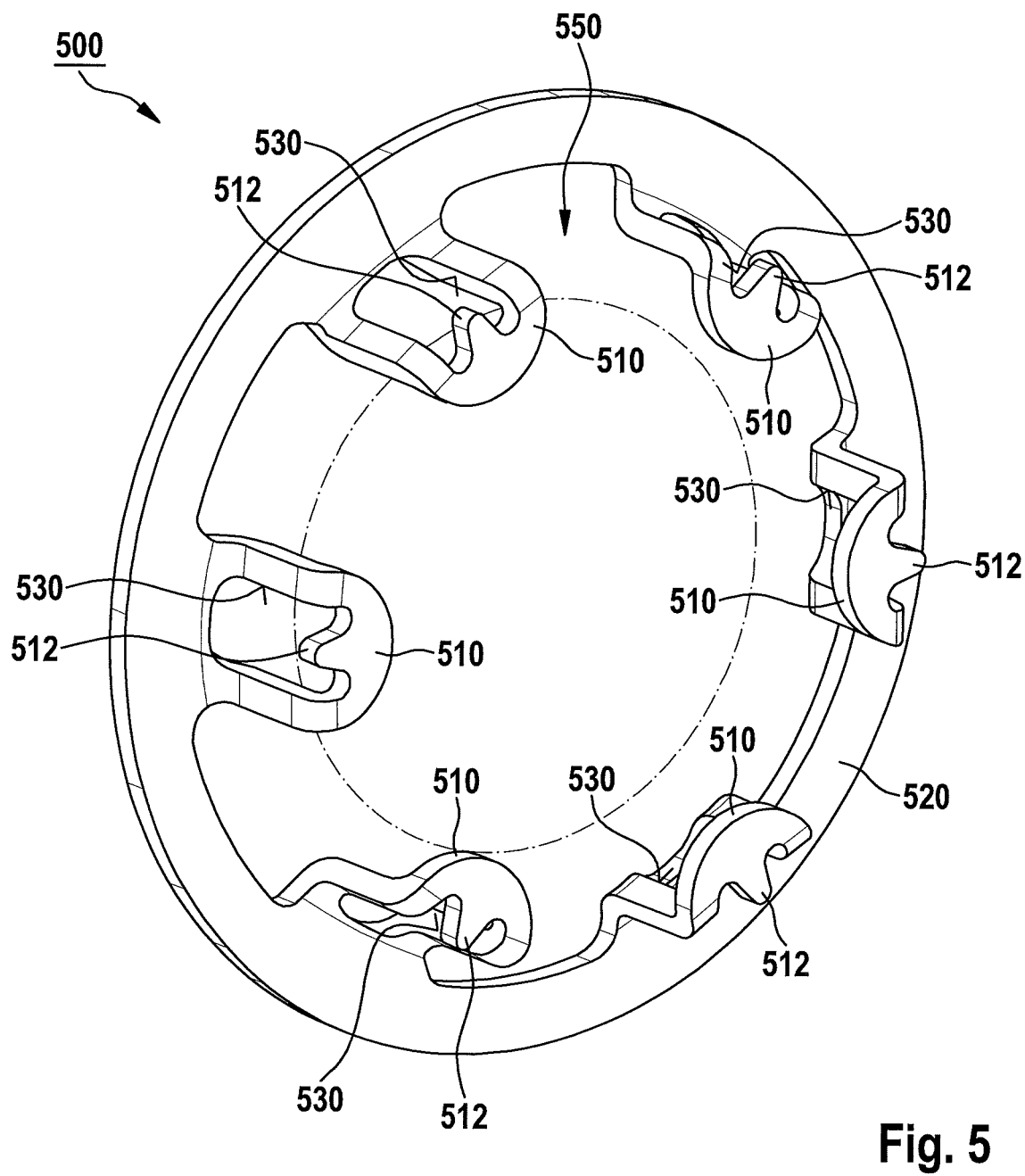
FIG. 5 shows a perspective view of the spring-holding element from FIGS. 2 and 3.

FIG. 5 shows spring-holding element 500 from FIGS. 2 and 3 for the purpose of illustrating exemplary ring-shaped actuating section 520, starting from which, a plurality of, for example, hook-shaped spring holders 510 extend, at least approximately parallel to its axis of rotation. As described above, they each have a perforation 530, aligned at least approximately perpendicular to reach-through opening 550 of actuating section 520, as well as a seating element 512.

Figure 6:
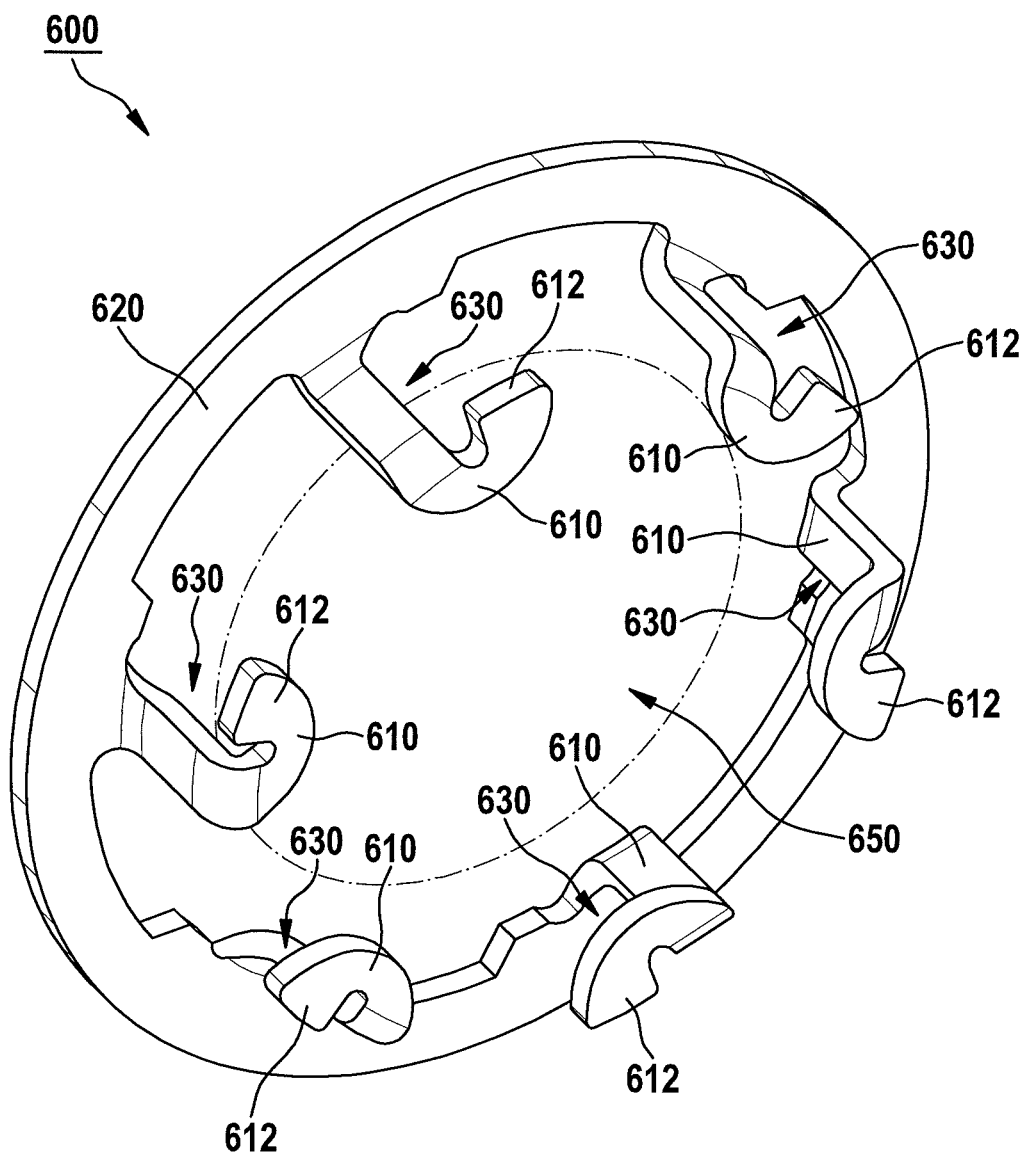
FIG. 6 shows a perspective view of a spring-holding element according to a further exemplary embodiment.

FIG. 6 shows a spring-holding element 600 according to a further exemplary embodiment, which may be used instead of spring-holding element 500 of FIGS. 2 through 5 in realizing torque clutch 160 of FIGS. 1 through 4. By way of example, spring-holding element 600 has a ring-shaped actuating section 620, starting from which, a plurality of, for example, hook-shaped spring holders 610 extend, at least approximately parallel to its axis of rotation. They each have an opening 630, aligned at least approximately perpendicular to a reach-through opening 650 of ring-shaped actuating section 620, as well as a seating element 612. For example, opening 630 is formed in the manner of a cutout, so that, for instance, hook-shaped spring holder 610 is roughly L-shaped.

What is claimed is:

1. A hand-held machine tool, comprising:
a drive spindle having a longitudinal axis;
a gear unit; and
a torque clutch including a torque-limiting coupling allocated to the gear unit and at least one spring element which is clamped between a limit-transfer element and a spring-holding element, the torque clutch being adapted to apply a predefined spring force to the limit-transfer element axially in the direction of the torque-limiting coupling, wherein the limit-transfer element is disposed at least partially between the torque-limiting coupling and the at least one spring element,
wherein the spring-holding element includes at least one opening, through which the at least one spring element reaches, at least sectionally,
wherein the spring-holding element includes an actuating section and at least one spring holder, on which the at least one opening is formed as a perforation or a cutout,
wherein the predefined spring force of the torque clutch is adjustable within predefined limits via an assigned torque-adjusting device, the torque-adjusting device including an adjusting ring,
wherein the adjusting ring is arranged radially outwardly and axially overlapping relative to the at least one spring element,
wherein a maximum radial distance of the at least one spring element relative to the longitudinal axis of the drive spindle is at least as large as a maximum radial distance of the at least one spring holder relative to the longitudinal axis of the drive spindle.

2. The hand-held machine tool according to claim 1, wherein the at least one spring holder is hook-shaped.

3. The hand-held machine tool according to claim 1, wherein the at least one spring holder is formed on the actuating section, wherein the actuating section, in order to tension or release the at least one spring element, is displaceable axially in a longitudinal direction of the at least one spring element.

4. The hand-held machine tool according to claim 3, wherein the actuating section is ring-shaped.

5. The hand-held machine tool according to claim 4, wherein the ring-shaped actuating section includes a reach-through opening that is aligned at least substantially perpendicular to the at least one opening.

6. The hand-held machine tool according to claim 3, wherein the actuating section is preloaded by the predefined spring force of the at least one spring element against the adjusting ring that is able to be acted upon via the torque-adjusting sleeve, assigned to a torque-adjusting device, for the axial displacement in the longitudinal direction of the at least one spring element.

7. The hand-held machine tool according to claim 3, wherein at a free end of the at least one spring holder, a seating element is provided, against which the at least one spring element abuts, at least sectionally.

8. The hand-held machine tool according to claim 7, wherein the seating element is aligned at least substantially parallel to the actuating section.

9. The hand-held machine tool according to claim 1, wherein the gear unit is assigned a gear housing, the gear housing having a periphery at which at least one groove-like cutout is formed in a longitudinal direction of the gear housing for receiving the at least one spring element.

10. The hand-held machine tool according to claim 1, wherein in the region of the at least one opening the adjusting ring is arranged immediately adjacent to the at least one spring element in a radial direction.

* * * * *